US012781876B2

(12) United States Patent
Almazan et al.

(10) Patent No.: US 12,781,876 B2
(45) Date of Patent: Nov. 3, 2026

(54) SYSTEMS AND METHODS FOR MONITORING A VALVE

(71) Applicant: Celeros Flow Technology, LLC, Charlotte, NC (US)

(72) Inventors: Raul Almazan, Charlotte, NC (US); John Barrows, Charlotte, NC (US); Pedro Flores-Castillo, Charlotte, NC (US)

(73) Assignee: Celeros Flow Technology, LLC, Charlotte, NC (US)

( * ) Notice: Subject to any disclaimer, the term of this patent is extended or adjusted under 35 U.S.C. 154(b) by 294 days.

(21) Appl. No.: 18/687,409

(22) PCT Filed: Sep. 1, 2022

(86) PCT No.: PCT/US2022/075833
§ 371 (c)(1),
(2) Date: Feb. 28, 2024

(87) PCT Pub. No.: WO2023/034912
PCT Pub. Date: Mar. 9, 2023

(65) Prior Publication Data

US 2024/0353025 A1 Oct. 24, 2024

Related U.S. Application Data

(60) Provisional application No. 63/239,504, filed on Sep. 1, 2021.

(51) Int. Cl.
*F16K 37/00* (2006.01)
*F16K 17/02* (2006.01)

(52) U.S. Cl.
CPC .......... *F16K 37/0091* (2013.01); *F16K 17/02* (2013.01)

(58) Field of Classification Search
CPC .... F16K 37/0091; F16K 17/02; F16K 37/005; G06N 3/0499; G06N 3/09
See application file for complete search history.

(56) References Cited

U.S. PATENT DOCUMENTS 10,641,668 B2 5/2020 Danzy et al.
2008/0175726 A1 7/2008 Bartell
2015/0219242 A1* 8/2015 Almazan ................ F16K 17/04 137/554

(Continued)

FOREIGN PATENT DOCUMENTS

CN 110953402 A * 4/2020 ......... F16K 37/0091

OTHER PUBLICATIONS

International Search Report & Written Opinion issued in PCT/US2022/075833, mailed Oct. 2, 2023 [13 pages].

*Primary Examiner* — Timothy P Graves
(74) *Attorney, Agent, or Firm* — IceMiller LLP

(57) ABSTRACT

A system may be configured to monitor surge relief. Some embodiments may: provide a surge relief valve; provide a set of instruments coupled to the surge relief valve and configured to output first and second data based on a prediction, each of the first and second data having a quality level satisfying a first criterion; provide a computer; and provide a non-transitory medium comprising instructions executable by the computer to report information based on the prediction that an operating characteristic of the surge relief valve is at an extent satisfying a second criterion.

18 Claims, 7 Drawing Sheets

(56) References Cited

U.S. PATENT DOCUMENTS

| | | | |
|---|---|---|---|
| 2020/0116170 | A1 | 4/2020 | Schmidt et al. |
| 2020/0355287 | A1 | 11/2020 | Lee et al. |
| 2021/0133607 | A1 | 5/2021 | Stubbs et al. |

* cited by examiner

SYSTEMS AND METHODS FOR MONITORING A VALVE

CROSS-REFERENCE TO RELATED APPLICATION

This application is a National Stage of International Application No. PCT/US2022/075833, filed Sep. 1, 2022, which claims priority to U.S. Provisional Patent Application No. 63/239,504, filed Sep. 1, 2021, titled "Systems and Methods for Monitoring a Valve," the disclosures of which are incorporated herein by reference in their entirety.

TECHNICAL FIELD

The present disclosure relates to electronic monitoring and control of pressure relief valves.

BACKGROUND

Surge relief is common in chemical processes, water, wastewater, fire protection, mining, pipelines such as oil and gas pipelines, loading terminals, and refining applications. A "surge," "hydraulic shock," or "water hammer" is a transient pressure change generated when a rate of fluid in a pipe changes quickly. Surge relief valves are used to respond quickly and durably to prevent excessive gain in pressure that would otherwise cause the hydraulic process pressure to exceed a maximum recommended working pressure of the mechanical equipment used in a system. Stopping or reducing the flowrate of a fast-flowing fluid may cause an upstream pressure increase called a positive surge and a downstream pressure decrease called a negative surge. Pressure surges travel at sonic velocities through the pipeline. These sonic velocities may range from 333 meters/second to over 1212 meters/second, in liquid pipelines, for example.

Inadequate surge protection may cause such problems as disengagement of pipeline components, pipe fatigue at weld joints, failures or pipe burst, permanent deformation of pipelines devices, damage on pumps, damage to piping and piping supports, and/or damage to specialized components. And undetected relief events and leakages may remain unnoticed for years. There is thus a need to increase reliability of a piping system or plant.

SUMMARY

High speed and/or high-resolution sensors may be used to locally record the details of process characteristics, such as pressure, and of valve operation transients, e.g., with resolution in time on the order of milliseconds. Sensors may be integrated in a relief valve and/or located nearby a valve. Data may be used to determine to control relief valve actuation based on detected trends in pressure and/or temperature conditions, e.g., in addition to responding to a threshold condition being achieved at the relief valve, and/or monitor valve response to relief actuation events.

Sensor data may be processed at a valve and/or communicated via high-speed transmission methods such as wire, cable, fiber, WiFi, cellular, or other communication media for autonomic processing by nearby equipment and/or central control systems. For example, in addition to convention control and monitoring instrumentation, special wireless communications channels may be activated upon detection of a surge transient within a fluid transport system such as a pipeline, allowing rapid autonomic responses to surge events. This allows regular operating equipment and/or relief valves to take action locally without waiting for instructions from a central command facility. Such instructions may be delayed or impaired by the low-bandwidth nature of conventional control signaling and monitoring and/or catastrophic damage to control equipment or networks, for example.

For example, a sensor in an upstream section of pipeline may detect the presence of a surge transient well before the surge wave reaches a critical downstream relief valve. The upstream sensor may communicate details of the surge wave transient to the downstream relief valve immediately via a cellular communication link. The downstream valve may then, in anticipation of the surge wave and character of the wave as observed at the upstream sensor, begin actuation of the relief valve accordingly, even before any change in pressure is visible at the relief valve itself. This may reduce or eliminate any delay in the response of the relief valve to the transient.

Similarly, high speed and/or high-resolution sensor data may be used to assess valve performance in response to surge waves over time. For example, high speed data may reveal changes in the valve's response to actuating events, which may reflect a deterioration of valve performance over time and/or use. Data of sufficiently high-resolution and high speed may detect subtle changes in performance indicative of a need for maintenance and/or replacement of the valve well before any substantial failure of relief to perform its intended function. Such determinations may be made at the valve, in a local control function, and/or by review of data at a central facility. High speed and/or high-resolution sensor data may be used, for example, to determine movement in the set point of valve response, response time, opening speed, piston position, back pressure, estimation of flow, overpressure transients. Such information may be used, for example, to determine or revise calculated mean time between failures (MTBF) or mean cycles between failures (MCBF)

Further, high speed and/or high-resolution sensor data may be used to assess valve performance in response to a present surge. For example, instrumentation on a valve may detect a failure of the valve to sufficiently address a present surge, whereby a determination may be made that other downstream equipment needs to be alerted of the inadequate response by the valve. The valve gate may be clogged, stuck, sticking, or simply inadequate to deal with the magnitude and/or speed of the surge. This may be detected in real time, and neighboring, downstream, and/or central equipment may be alerted immediately, e.g., with a special high speed wireless channel such as cellular communications.

Techniques are disclosed herein for monitoring data collected from high speed and/or high-resolution sensors to detect and evaluate relief valve events. Sensor data may be acted upon locally and/or made remotely available via a wired or wireless network to use and analyze. Accordingly, one or more aspects of the present disclosure relate to a method, comprising: providing a surge relief valve; providing a set of instruments (i) coupled to the surge relief valve and (ii) configured to output first and second data based on a prediction, each of the first and second data having a quality level satisfying a first criterion; providing a computer configured to report information based on the prediction that an operating characteristic of the surge relief valve is at an extent satisfying a second criterion.

The method is implemented by a system comprising one or more hardware processors configured by machine-readable instructions and/or other components. The system comprises the one or more processors and other components or media, e.g., upon which machine-readable instructions may be executed. Implementations of any of the described techniques and architectures may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features may be apparent from the following description, including the drawings and claims. The drawings, though, are for the purposes of illustration and description only and are not intended as a definition of the limits of the disclosure.

DETAILED DESCRIPTION

Figure 1:
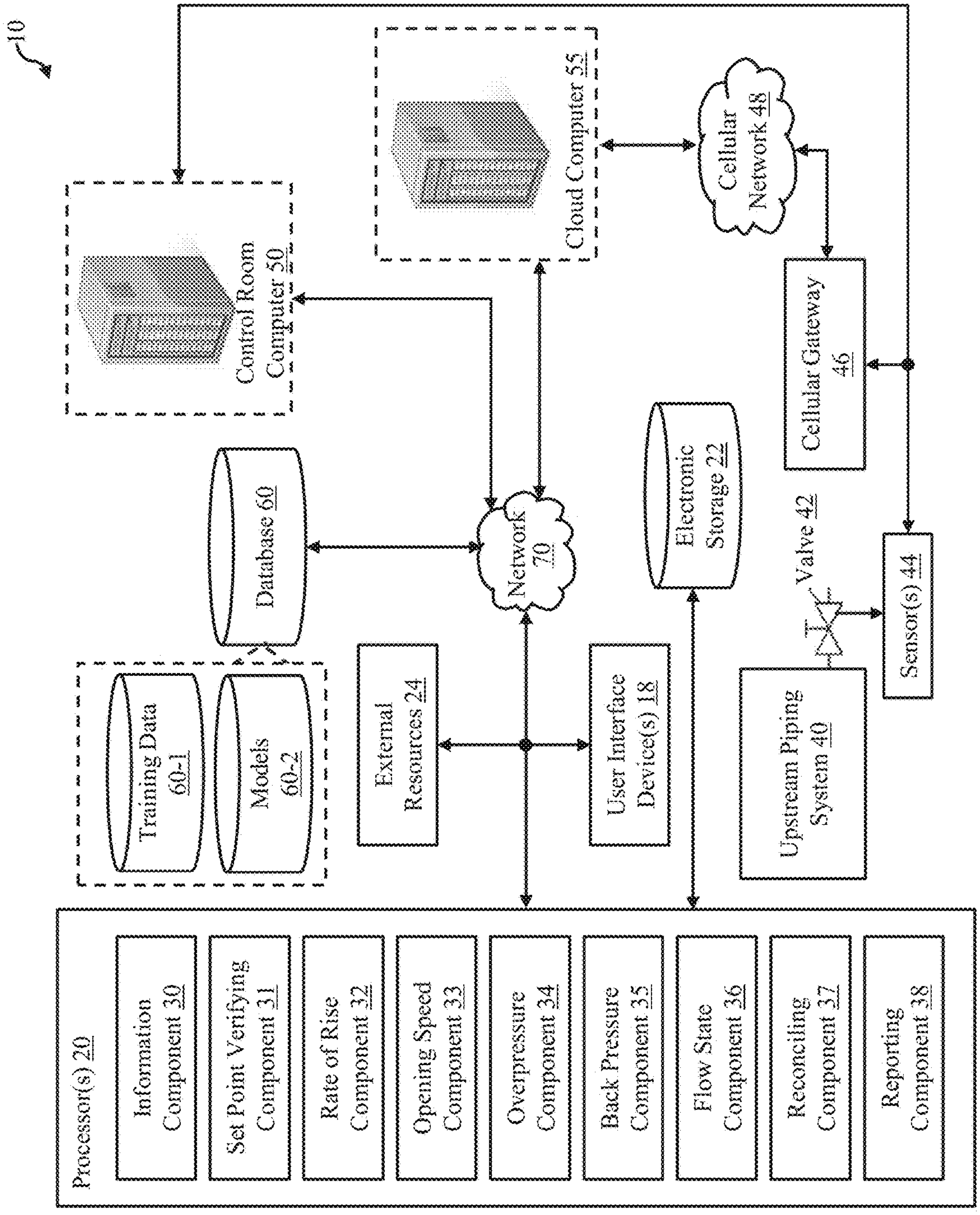
FIG. 1 illustrates an example of a system in which valve behavior is analyzed, in accordance with one or more embodiments.

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Presently disclosed are ways of monitoring valves, which may include live or continuous monitoring of valve performance and safety, conducting condition-based maintenance, using sensors for remote connectivity, and/or optimizing a design that is supported by a simulated behavior. As such, the disclosed approach may increase product reliability, reduce unexpected failures, and/or reduce maintenance costs.

FIG. 1 illustrates a system 10 configured to obtain a high-resolution data stream that may provide the necessary information to deliver an extra layer of information of the performance of valve 42 to a user of piping system 40. The herein-disclosed monitoring may be used on single valves of any type, including surge relief skids or other applications, and aspects of system 10 may be installed on new products or retrofitted onto valves in the field.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., UI device 18, processor 20, etc.). In some embodiments, electronic storage 22 may be located in a server together with processor 20, in a server that is part of external resources 24, in UI devices 18, and/or in other locations. Electronic storage 22 may comprise a memory controller and one or more of optically readable storage media (e.g., optical disks, etc.), magnetically readable storage media (e.g., magnetic tape, magnetic hard drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via UI devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply (e.g., battery powered or line-power connected, such as directly to 110 volts AC or indirectly via AC/DC conversion), a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 24 may be provided by other components or resources included in system 10. Processor 20, external resources 24, UI device 18, electronic storage 22, a network, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN), etc.), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

UI device(s) 18 of system 10 may be configured to provide an interface between one or more users and system 10. UI devices 18 are configured to provide information to and/or receive information from the one or more users. UI devices 18 include a UI and/or other components. The UI may be and/or include a graphical UI configured to present views and/or fields configured to receive entry and/or selection with respect to particular functionality of system 10, and/or provide and/or receive other information. In some embodiments, the UI of UI devices 18 may include a plurality of separate interfaces associated with processors 20 and/or other components of system 10. Examples of interface devices suitable for inclusion in UI device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that UI devices 18 include a removable storage interface. In this example, information may be loaded into UI devices 18 from removable storage (e.g., a smart card, a flash drive, a removable disk) that enables users to customize the implementation of UI devices 18.

In some embodiments, UI devices 18 are configured to provide a UI, processing capabilities, databases, and/or electronic storage to system 10. As such, UI devices 18 may include processors 20, electronic storage 22, external resources 24, and/or other components of system 10. In some embodiments, UI devices 18 are connected to a network (e.g., the Internet). In some embodiments, UI devices 18 do not include processor 20, electronic storage 22, external resources 24, and/or other components of system 10, but instead communicate with these components via dedicated lines, a bus, a switch, network, or other communication means. The communication may be wireless or wired. In some embodiments, UI devices 18 are laptops, desktop computers, smartphones, tablet computers, and/or other UI devices.

Data and content may be exchanged between the various components of the system 10 through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose, the Internet Protocol (IP) defines addressing methods and structures for datagram encapsulation. Of course, other protocols also may be used. Examples of an Internet protocol include Internet Protocol version 4 (IPv4) and Internet Protocol version 6 (IPv6).

In some embodiments, a component of processors 20 may (e.g., in an emergency condition or relative to an event) send data corresponding to valve 42 and/or obtain data from a device corresponding to an upstream valve or to another part of piping system 40.

In some embodiments, a set of processor 20 components may be implemented, e.g., at an edge or Internet of things (IoT) device. For example, this set of processor components and/or another set of processor components may form part (e.g., in a same or separate housing) of a user device, a consumer electronics device, a mobile phone, a smartphone, a personal data assistant, a digital tablet/pad computer, a wearable device (e.g., watch), augmented reality (AR) goggles, virtual reality (VR) goggles, a reflective display, a personal computer, a laptop computer, a notebook computer, a work station, a server, a high performance computer (HPC), a vehicle (e.g., embedded computer, such as in a dashboard or in front of a seated occupant of a car or plane), a game or entertainment system, a set-top-box, a monitor, a television (TV), a panel, a space craft, and/or any other device. In this or another example, the edge or IoT device may have a performance satisfying a lesser criterion than, e.g., a desktop computer, HPC, or server.

In some embodiments, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, UI devices 18, devices that are part of external resources 24, electronic storage 22, and/or other devices).

As shown in FIG. 1, processor 20 is configured via machine-readable instructions to execute one or more computer program components. The computer program components may comprise one or more of information component 30, set point verifying component 31, rate of rise component 32, opening speed component 33, overpressure component 34, back pressure component 35, flow state component 36, reconciling component 37, reporting component 38, and/or other components. Processor 20 may be configured to execute components 30, 31, 32, 33, 34, 35, 36, 37, and/or 38 by: software; hardware; firmware; some combination of software, hardware, and/or firmware; and/or other mechanisms for configuring processing capabilities on processor 20.

It should be appreciated that though components 30-38 are illustrated in FIG. 1 as being co-located within a single processing unit, in embodiments in which processor 20 comprises multiple processing units, one or more of components 30, 31, 32, 33, 34, 35, 36, 37, and/or 38 may be located remotely from the other components. For example, in some embodiments, each of processor components 30-38 may comprise a separate and distinct set of processors. The description of the functionality provided by the different components 30, 31, 32, 33, 34, 35, 36, 37, and/or 38 described below is for illustrative purposes, and is not intended to be limiting, as any of components 30, 31, 32, 33, 34, 35, 36, 37, and/or 38 may provide more or less functionality than is described. For example, one or more of components 30, 31, 32, 33, 34, 35, 36, 37, and/or 38 may be eliminated, and some or all of its functionality may be provided by other components 30, 31, 32, 33, 34, 35, 36, 37, and/or 38. As another example, processor 20 may be configured to execute one or more additional components that may perform some or all of the functionality attributed below to one of components 30, 31, 32, 33, 34, 35, 36, 37, and/or 38.

In some embodiments, cloud computer 55 or a component of processors 20 may determine rules for an IoT device. In these or other embodiments, cloud computer 55 or a component of processors 20 may train model(s) 60-2, e.g., to predict a performance state, condition, or level of valve 42 and/or of upstream piping system 40. Alternative or additionally, the IoT device itself may predict the performance or behavior. And, in some implementations, one or more components of processors 20 may be implemented at cloud computer 55.

In some embodiments, cloud computer 55 may be facilitated and/or interacted via a web portal. And such cloud computing may lead to implementation of an IoT platform.

In some embodiments, the IoT or edge device may acquire data from sensors 44 and interface with cellular gateway 46. In these or other embodiments, a set of instruments 44 may be mounted in relation (e.g., close) to surge/control relief valve 42 and/or the IoT or edge device. For example, a set of instruments 44 may be configured to output data (e.g., via network 48 or network 70), each datum being at a quality level satisfying a criterion and processed in near real-time.

Artificial neural networks (ANNs) are models used in machine learning that may have artificial neurons (nodes) forming a network through adjustable synaptic interconnections (weights), e.g., at least throughout training. An ANN may be configured to determine a classification or type based on input data or other sensed information. Such artificial networks may be used for predictive modeling. The prediction models may be and/or include one or more neural networks (e.g., deep neural networks, artificial neural networks, or other neural networks), other machine learning models, or other prediction models.

Each neural unit of a neural network may be connected with many other neural units of the neural network. Such connections may be enforcing or inhibitory, in their effect on the activation state of connected neural units. In some embodiments, neural networks may include multiple layers (e.g., where a signal path traverses from input layers to output layers). In some embodiments, back propagation techniques may be utilized to train the neural networks, where forward stimulation is used to reset weights on the front neural units.

Disclosed implementations of artificial neural networks may apply a weight and transform the input data by applying a function, this transformation being a neural layer. The function may be linear or, more preferably, a nonlinear activation function, such as a logistic sigmoid, Tanh, or rectified linear activation function (ReLU) function. Intermediate outputs of one layer may be used as the input into a next layer. The neural network through repeated transformations learns multiple layers that may be combined into a final layer that makes predictions. This learning (i.e., training) may be performed by varying weights or parameters to minimize the difference between the predictions and expected values. In some embodiments, information may be fed forward from one layer to the next. In these or other embodiments, the neural network may have memory or feedback loops that form, e.g., a neural network. Some embodiments may cause parameters to be adjusted, e.g., via back-propagation.

An ANN is characterized by features of its model, the features including an activation function, a loss or cost function, a learning algorithm, an optimization algorithm, and so forth. The structure of an ANN may be determined by a number of factors, including the number of hidden layers, the number of hidden nodes included in each hidden layer, input feature vectors, target feature vectors, and so forth. Hyperparameters may include various parameters which need to be initially set for learning, much like the initial values of model parameters. The model parameters may include various parameters sought to be determined through learning. And the hyperparameters are set before learning, and model parameters may be set through learning to specify the architecture of the ANN.

Learning rate and accuracy of an ANN rely not only on the structure and learning optimization algorithms of the ANN but also on the hyperparameters thereof. Therefore, in order to obtain a good learning model, it is important to choose a proper structure and learning algorithms for the ANN, but also to choose proper hyperparameters.

The hyperparameters may include initial values of weights and biases between nodes, mini-batch size, iteration number, learning rate, and so forth. Furthermore, the model parameters may include a weight between nodes, a bias between nodes, and so forth. In general, the ANN is first trained by experimentally setting hyperparameters to various values, and based on the results of training, the hyperparameters may be set to optimal values that provide a stable learning rate and accuracy.

In some embodiments, the learning of models 60-2 may be of reinforcement, supervised, and/or unsupervised type. For example, there may be a model for certain predictions that is learned with one of these types but another model for other predictions may be learned with another of these types.

Once trained, models 60-2 of FIG. 1 may be deployed to generate predictions. Models 60-2 may analyze made predictions against a reference set of data called the validation set. In some use cases, the reference outputs resulting from the assessment of made predictions against a validation set may be provided as an input to the prediction models, which the prediction model may utilize to determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input data. For example, a labeled training dataset may enable model improvement. That is, the training model may use a validation set of data to iterate over model parameters until the point where it arrives at a final set of parameters/weights to use in the model.

In some embodiments, one or more components of processors 20 may implement an algorithm for building and training one or more deep neural networks. In some embodiments, a deep learning model may be trained on training data 60-1 to provide even more accuracy, after successful tests with these or other algorithms are performed and after the model is provided a large enough dataset.

A model implementing a neural network may be trained using training data obtained by a component of processors 20 from training data 60-1 storage/database. The training data obtained from prediction database 60 of FIG. 1 may comprise hundreds, thousands, or even many millions of pieces of sensed information (e.g., describing behavior of a valve of system 10). The dataset may be split between training, validation, and test sets in any suitable fashion. For example, some embodiments may use about 60% or 80% of the training data for training or validation, and the other about 40% or 20% may be used for validation or testing. In another example, the processor component may randomly split the labelled training data, the exact ratio of training versus test data varying throughout. When a satisfactory model is found, it may be trained on 95% of the training data and validated further on the remaining 5%.

The validation set may be a subset of the training data, which is kept hidden from the model to test accuracy of the model. The test set may be a dataset, which is new to the model to test accuracy of the model. The training dataset used to train prediction models 60-2 may leverage an SQL server and a Pivotal Greenplum database for data storage and extraction purposes.

In some embodiments, one or more components of processors 20 may enable one or more prediction models to be trained. The training of the neural networks may be performed via several iterations. For each training iteration, a classification prediction (e.g., output of a layer) of the neural network(s) may be determined and compared to the corresponding, known classification. For example, sensed data known to capture a closed environment comprising dynamic and/or static objects may be input, during the training or validation, into the neural network to determine whether the prediction model may properly predict a path for the user to reach or avoid said objects. As such, the neural network is configured to receive at least a portion of the training data as an input feature space. Once trained, the model(s) may be stored in database/storage 60-2 of prediction database 60, as shown in FIG. 1, and then used to classify samples based on their attributes. Database 60 may be on-site, e.g., such as in proximity to valve 42 at an edge device. In this or another example, functions implemented via this database may be local, before data is sent to a centralized center, effectively causing computer 50 to be next to valve 42 as opposed to in a control room.

In some embodiments, surge relief valves 42 may be stand-alone instances that monitor the set point of the valve, e.g., based on the pressure of the nitrogen cavity/reservoir. In these or other embodiments, the inlet pressure may be measured as a part of upstream pipeline system 40, e.g., providing information and resolution for valve 42 during a surge event. An indirect method may be accomplished using a flow switch installed at the outlet of the valve to provide some way of indication that the valve open and fluid passed from the inlet cavity to the outlet relieving the pressure offset in the system. And another method may include direct contact with the valve piston providing the position and correlation between the inlet pressure and the cavity pressure, to evaluate a magnitude and duration of the event. The networking communication between valve 42 and corresponding devices may be wired or wireless, e.g., to a control room or locally to the IoT or edge device (which may perform the reporting). As such, some disclosed embodiments May perform a tradeoff between bandwidth limitations and power usage at an IoT device taking part in this communication.

The magnitude of a pressure wave may be influenced by the initial pipeline velocity, the static head, the pipe's length, the material (e.g., of a seamless pipe or another type of manufactured pipe), and friction (e.g., which may cause a different velocity profile, affecting how the pressure wave travels through pipeline 40). In some embodiments, information component 30 may obtain high-resolution data from sensors 44, to better ensure integrity of the pipelines. And other component(s) of processors 20 may perform the subsequent data analysis related to proper surge relief.

The disclosed approach may enable users of piping system 40 to monitor the condition of equipment in the field. For example, reporting component 38 may deliver information (e.g., including high-resolution sensor data about the event) in a window of time.

To remotely monitor valve 42 and to collect valve state data at a rate suitable for determining significant changes, disclosed embodiments may: acquire data from valve 42 using sensors 44 and cellular gateway 46; transport the acquired data via cellular network 48, which may connect the edge equipment and the valve to cloud-based IoT environment 55; process the environment for IoT platform; and facilitate visual consumption of data indicating the valve's condition via a dashboard or at a web portal that resides within the cellular network. In some embodiments, the Internet or network 70 may connect the web browser dashboard and the cellular network instance of the cloud platform. The foregoing processing of the environment may be at an edge device, which may detect an event (e.g., preset event) locally, while the high-resolution data is monitored and recorded. Once a predetermined event is detected, an information package may be generated. This information package may contain high-resolution data before and after the event. This package is sent then via IoT for further analysis and cloud storage and consumption.

System 10 may provide a message at the defined lapse of time to provide status and report on demand (e.g., when a threshold is achieved) a warning message to the user and the high-resolution data stream of samples collected before and after the incident loaded in the portal. For example, the message may be sent at a time of a request. For historic events, this data may be stored in computer 55 or computer 50.

In some embodiments, valve 42 may be a surge relief valve (e.g., to prevent water hammer by opening and dissipating when system pressure exceeds a set shut-off pressure) or another valve, such as a control valve. And sensors 44 mounted thereabout may each be any type of external sensor, such as for temperature, pressure, vibration, or another performance or physical parameter. In this case, the high-resolution may not be achieved by the sensor itself. Typically these are analog sensors. The high-resolution data may be obtained via an analog to digital converter (ADC) having a very high sampling rate. In an example, a sample taken every 100 milliseconds may provide enough resolution to see a physical parameter but not high enough to cause issues with storage or data package transmission. The rate may be configured to be fast enough to make sense of the information, given that surge events can be over in less than 1 second. In some embodiments, instruments 44 may simultaneously sense a different operational characteristic of valve 42. SCADA systems typically transmit information every second or more. A SCADA system is not configured to observe high speed events, such as a surge event. Whereas a SCADA system may store all data historically, the herein-disclosed approach may store high-resolution data of predetermined triggers, effectively only the important data.

In implementations where valve 42 is a surge relief valve, this valve may have an adjustable set point that is directly related to the maximum pressure of the pipeline/system.

For example, one end of valve 42 may couple to upstream piping system 40, and another end of this valve may couple to an outlet, breakout tank, or recirculation system, for receiving fluid from the piping system in a surge event. In the event of a surge, just that quantity of liquid which is necessary to relieve pressures of unsafe proportions may be discharged or bled out. The opening and/or closing of this or another valve in system 10 may be performed via electrical, hydraulic, or pneumatic actuators.

In implementations where valve 42 is a control valve, this valve may control fluid flow by varying a size of the flow passage as directed by a signal from a controller. This may be achieved via a feedback signal to open or close the valve to a given aperture to let a given amount of fluid go by.

In some embodiments, valve 42 may use the piston style, with a nitrogen control system and external plenums, or use elastomeric tubes, external pilots, or internal chambers. In these or other embodiments, valve 42 may have a housing having a longitudinal axis, a piston disposed within the housing and configured for reciprocal motion along the axis, and an electrical position sensor configured to resolve axial positions of the piston relative to the piston housing. The position sensor may have a sensor body coupled to the piston housing and a movable electrical element, including a plunger rod slidingly received by the sensor body to move linearly relative to the sensor body and axially with the piston; the position sensor may be configured to generate an electrical response that correlates to the position of the piston relative to the piston housing.

Figure 2:
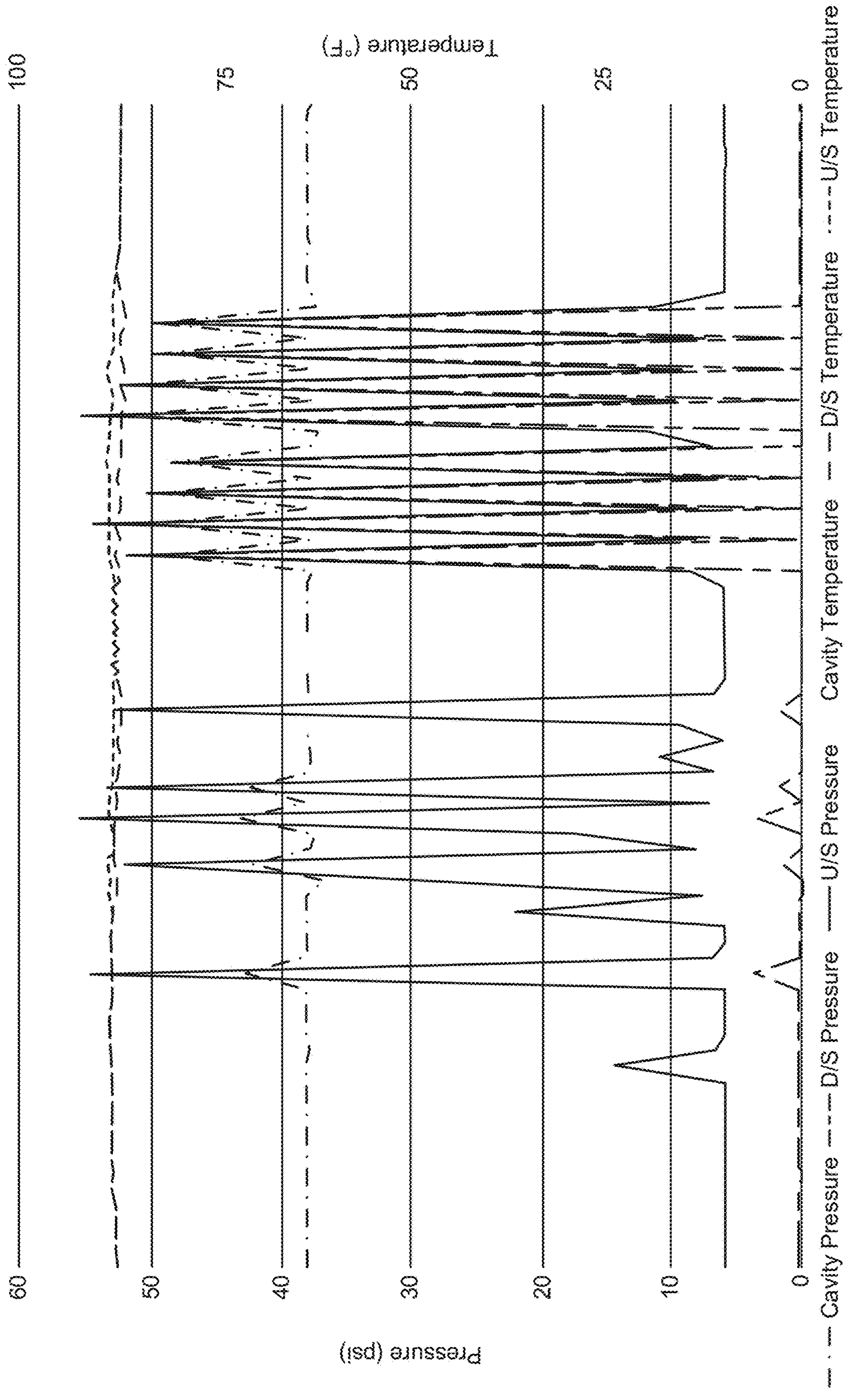
FIG. 2 (Prior Art)
FIG. 2 illustrates example performance analysis of 12 events, in accordance with the prior art.

In the prior art example of FIG. 2, sensor data is sampled once every 10 seconds. As such, there is insufficient resolution to draw useful conclusions (e.g., as to speed of the valve opening and/or another performance attribute). But, in the example of FIG. 3, sensor data is sampled 100 times every 1 second. As such, there may be sufficient resolution to draw useful conclusions.

In some embodiments, information component 30 may acquire output signals corresponding to valve 42 from a set (i.e., one or more) of sensors, responsive to a detected event. For example, this or another component of processors 20 may transmit associated (e.g., before, during, and/or after the event) data through cellular network 48. In this or another example, the sensor output may be stored in cloud computer 55. As such, sensor data may be accessible (e.g., at the IoT device itself, at control room 50, at cloud computer 55, and/or at a user device).

In some embodiments, data obtained from each sensor 44 may be collected for a defined time (e.g., about 10 seconds) before, during, and/or after an event. The definition of these times may be predetermined or set via a user of system 10 (e.g., via user interface (UI) devices 18). And the resolution of this data (e.g., a natural number N of points or samples per second, which may satisfy a high-quality or high-precision criterion) may also be defined, e.g., via UI device 18 and a user of system 10. For example, the rate of sampling by sensors 44 may be on the order of a few milliseconds. Typically these are analog sensors; therefore, the sensing speed may be continuous. The sampling rate may be given by the ADC unit. As such, entire areas of diagnostic and functionality may be enabled by the higher acquisition speed, which were not possible in prior systems.

Sensors 44 may be a set of instruments that provide information on valve set point, rate of pressure rise, opening speed, overpressure event, back pressure, flow condition, and/or flow quantity. In some implementations, a quality level of the instrumentation data may be higher due to a resolution (e.g., a greater depth in detail) and/or sampling rate (e.g., a finer time interval). As such, system 10 may have ability to assess, with the higher quality data, whether pipeline 40 has air or debris in the line and/or whether performance of the valve system has begun to degrade.

In some embodiments, processors 20 may have greater insight into what has failed or is underperforming, and when and why that has occurred. In these or other embodiments, a component of processors 20 may determine whether the valve or another safety mechanism has worked. Additionally or alternatively, processors 20 may indicate (i) how a design of piping system 40 is operating and (ii) performance of valve 42, e.g., for the sake of redesigning one or more parts thereof. This may be significant, as valve 42 may be passive (e.g., secondarily used in the event something goes wrong, rather than primarily when operation is normal) and not part of a control loop. There may thus be multiple levels of feedback, including feedback about the valve performance, the surge events, whether too many events are occurring, what piping components to replace, the way upstream system 40 is being controlled, and/or the layout of this piping system.

In some embodiments, information component 30 may obtain sensor data at a high-resolution. But, to support that without having bandwidth or power issues at the IoT or edge device at each valve 42, this device may store the obtained information and transmit it (e.g., wirelessly) only whenever there is an event. This obtained information may be transmitted in a data package including sensor data corresponding to a time range before the event, a time range during the event, and a time range after the event. In these or other embodiments, cloud-based computer 55 may be configured to obtain the outputted data (e.g., via cellular network 48) and to store this outputted data.

Figure 3:
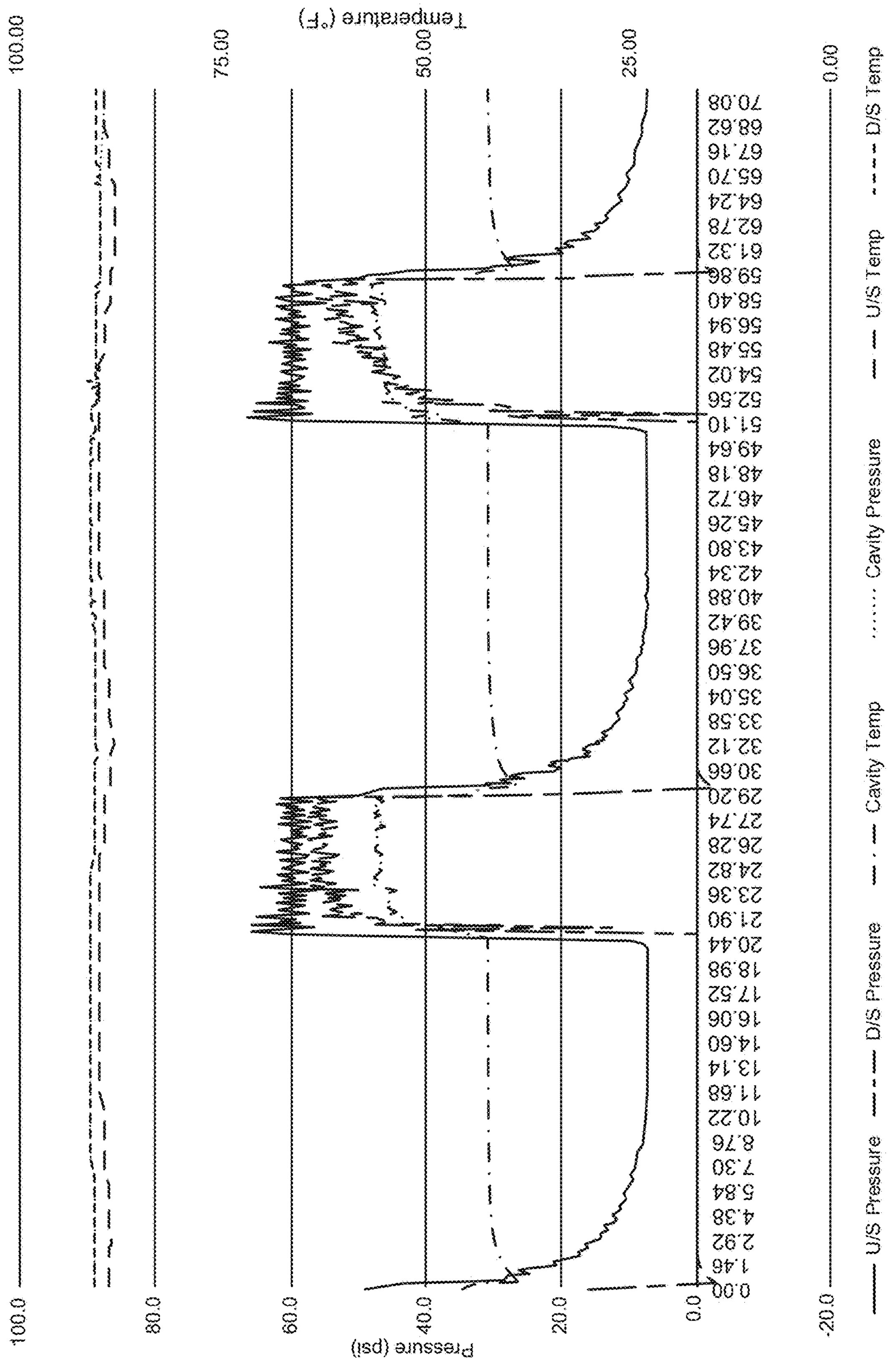
FIG. 3 illustrates example performance analysis of 2 events, in accordance with one or more embodiments.

An event may be detected, when the inlet pressure exceeds the configurable set point of the valve's cavity. For example, FIG. 3 depicts two full events, a full event being when system 10 reacts to the event and valve 42 starts to relieve the pressure from pipeline 40, which is when the upstream pressure substantially starts to decrease.

In some embodiments, cloud computing resource(s) 55 may be provisioned or otherwise made available on-demand. The software and hardware of cloud computer 55 may be implemented at an Internet-based data center and comprise one or more of a server, database, storage, analytic, network, and intelligence.

In some embodiments, information component 30 may obtain real data and/or system conditions from sensors 44 in the field, to know how the valve is behaving. For example, this data (or even simulation data) may be obtained and analyzed to optimize the design of valve 42 (or another component of piping system 40). Such design changes may result in improved performance in the field, e.g., where underperformance begins at about 1,000 cycles instead of underperformance occurring at about 450 cycles.

In some embodiments, reporting component 38 may issue a system alarm based on a prediction that an operating characteristic of valve 42 is at a criterion satisfying extent. For example, a user may be notified when an established threshold is reached. An example of this threshold may include (i) reduction of the set point (nitrogen pressure in the valve cavity), (ii) inlet pressure exceeding the valve set point (surge event), and/or (iii) when a valve pressure increases too greatly between two or more consecutive readings, such threshold breaching being respectively performed by set point verifying component 31, overpressure component 34, and/or rate of rise component 32. In these or other embodiments, the automatic alerts may be delivered to users of system 10 via e-mail, web portal notification, or a notification at a user device.

In some embodiments, reporting component 38 may inform a user of system 10 that valve(s) 42 is degrading over time. Such alerting may be reported in near real-time. In these or other embodiments, reporting component 38 may report data, e.g., upon the valve set point being exceeded or upon another behavioral detection. For example, behavioral prediction may be performed via database 60.

In some embodiments, the signals outputted from sensors 44 may indicate information determinative of whether reporting component 38 should issue an alarm (e.g., upon a threshold being exceeded). In these or other embodiments, the signals outputted from sensors 44 may indicate (e.g., upon a user request, periodically, or at an irregular rate) information for set point verifying component 31 to verify that a current set point of the valve is correct.

In some embodiments, set point verifying component 31 may verify the set point of valve 42. For example, this component may enable a quick access, for the user to verify the valve set point, verify the nitrogen level, and/or identify any shift of the valve set point; this may happen a posteriori of an event or with historical information, or it may be estimated based on historical records. In this or another example, a current valve set point of a pressure of nitrogen may be displayed responsive to a user request at an online portal and/or at control room computer 50.

In some embodiments, overpressure component 34 may obtain event overpressure data. For example, every time the valve set point is exceeded by upstream processing, high-resolution data stream is collected. As a result of the herein-disclosed approach, users of system 10 may more quickly investigate overpressure events with higher-resolution data and analyze historical performance. In these or other embodiments, reporting component 38 may generate and send a report to alarm a user of system 10, e.g., based on at least one of a maximum operating pressure of a pipeline satisfying a predetermined criterion.

Figure 6:
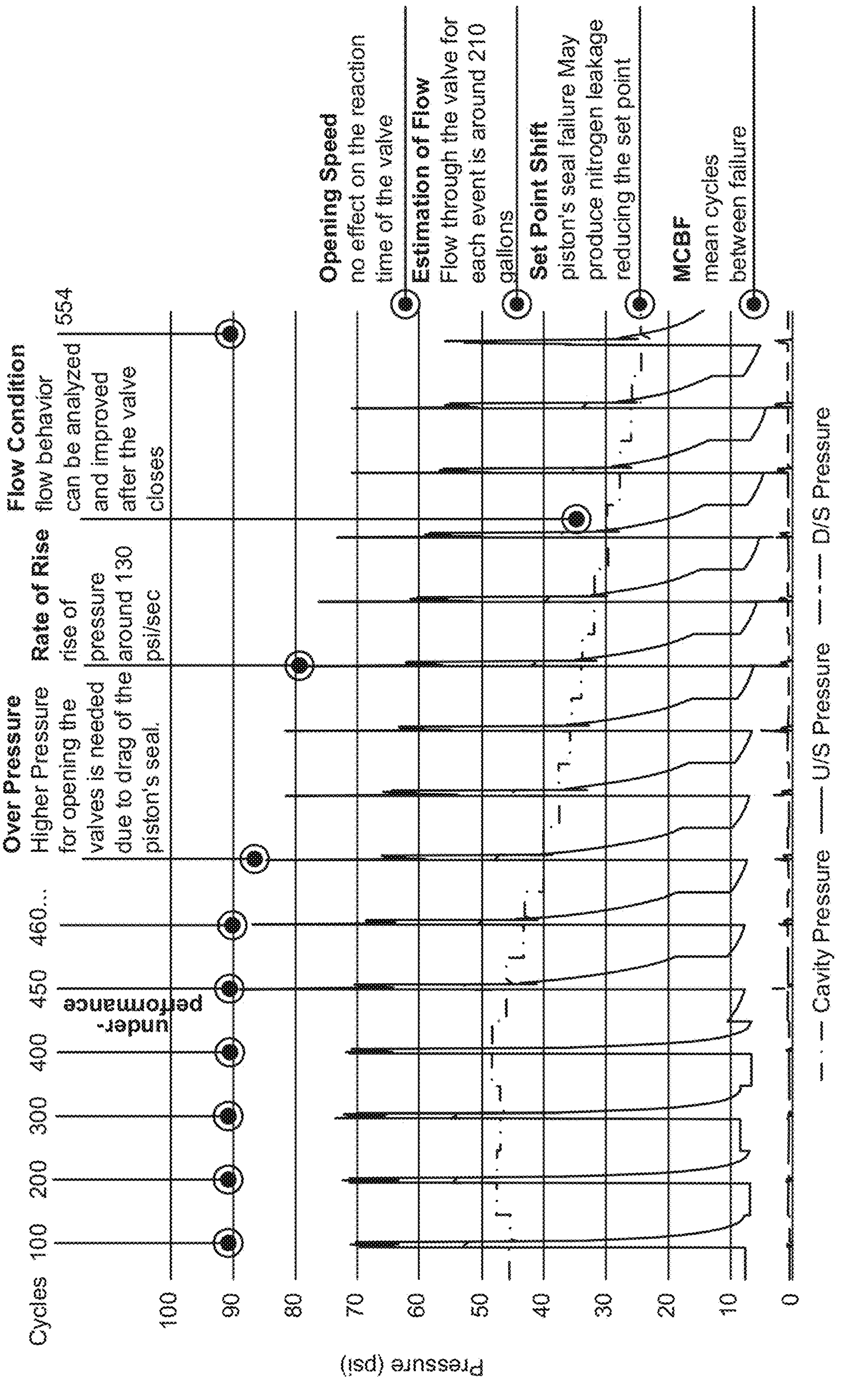
FIG. 6 illustrates example performance analysis of hundreds of events, in accordance with one or more embodiments.

In some embodiments, overpressure component 34 or another component of processors 20 may determine signature or pattern behavior, which may indicate a problem happening to valve 42. For example, as shown in FIG. 6 at 450 cycles of operation, the set point of the valve starts to shift, creating a different opening signature. In this example, at 450 cycles and beyond, a higher pressure or spike (i.e., 90 PSI overpressure of short duration) may be observed by the processor component. This failure of the valve to open or this indication of underperformance may be due to a damaged part, e.g., an O-ring (e.g., a seal between the chamber and the outlet containing the nitrogen may not be correctly placed on the gland) which may create a drag on the opening of the piston/plug. As such, with this type of analysis and with this resolution of data, reporting component 38 may alert this issue to the users of system 10, without the issue getting worse and without needing to go through more cycles of underperformance. Dynamically identifying root causes of potential, future failure may enable users to remedy or otherwise fix the problem.

In some embodiments, overpressure component 34 or another component of processors 20 may obtain a performance signature or factory characterization of a valve during some events (e.g., in a lab setting or in a simulation) and then compare that behavior with deployment behavior over time to determine opportunity to fix an issue before it becomes exacerbated. For example, this may be done through the collective analysis (training) of the behavior via artificial intelligence.

In some embodiments, flow state component 36 may estimate flow quantity and piston position during the surge event. For example, this component may estimate a quantity of the flow based on the opening speed (e.g., a velocity), the position of the piston (e.g., which may be estimated based on a change in the cavity pressure), the actual timing of the event, and the valve's flow coefficient (CV), which is the flow capability of a control valve at fully open conditions relative to the pressure drop across the valve. In these or other embodiments, flow state component 36 may estimate the flow using a valve cavity curve. In some instances herein, the term estimation may refer to an approximation rather than a precise determination.

In some embodiments, flow state component 36 may further provide insight information about the flow condition, e.g., after the closing of valve 42. It may be significant to know how long a valve was open. Thus, a confirmation that the valve has returned to its closed position may be obtained. In the case of loss of power or pressure, system 10 may default to opening the valve. After power is restored, the system can then confirm if a valve remains open or if it has closed.

In some embodiments, back pressure component 35 may determine an effect of the back pressure on valve 42 and/or may verify the correct valve size upon analyzing the high-resolution data stream. This component may thus determine whether there is back pressure in piping system 40, which may not have been considered in the design phase. For example, back pressure and valve size may affect the performance or behavior of the valve, and sometimes this information is not part of the information used during sizing of the valve. Additionally or alternatively, component 35 or another component of processors 20 may verify proper use of valve 42 or determine whether the valve is performing differently from how it is expected to operate.

Effect of the back pressure and the correct valve size may be verified with the analysis of the high-resolution data stream. For example, back pressure component 35 may determine that valve 42 is oversized or not big enough based on current performance. Each of these functions may need an additional sensor. For example, one sensor may be used for the upstream pressure, and another one for the downstream pressure (Back pressure). The back pressure sensor may simply confirm the differential between the upstream and downstream, to confirm that the valve will open. The time to open a surge valve may be dependent on this differential pressure, and valves may be sized by taking this into consideration.

In some embodiments, opening speed component 33 may obtain a high-resolution data stream to indisputably determine or verify the valve opening speed (i.e., reaction time) and/or another aspect of valve performance. For example, this component may calculate the opening speed based on an increase of pressure of nitrogen in the cavity behind the piston or based on a sudden change in the pressure at a pilot operated valve. And component 33 may output opening speed information.

In some embodiments, opening speed component 33 may obtain high-resolution data to provide a realistic opening speed; this may be significant in implementations requiring as fast as possible overpressure relief (e.g., on the order of milliseconds), when a surge event occurs. For example, this component may obtain that data to verify the reaction time of valve 42 (e.g., by determining whether this time satisfies a performance criterion). This may be significant, as opening speed could be affected by a faulty component, e.g., making the valve stick.

In some implementations, a difference between a time when overpressure is detected (e.g., by component 34) and a time when valve 42 opens is called the opening speed, this reaction time being a performance attribute of the valve. Since the pressure surge may travel through pipeline 40 at about the speed of sound, the valve may be required to open very quickly. For example, FIG. 6 depicts an initial inlet pressure spike at 450 cycles exceeding the valve's ability to open quickly, and pipeline 40 may eventually cease ability to support that spike even though it may be short. This spike may be undesirable. Pipe systems and relief system are often calculated based on the assumption that pressure surges could occur, and surge valves are sized to provide ample relief before a spike that could affect the ability of the pipeline to hold pressure. Typically, a pipeline will have a safety factor associated to it to prevent this to happen.

Merely to give contextual reference, 450 operational cycles of valve 42 may take weeks, months, or even years to reach. But subtle, uncharacteristic spikes thereof may indicate that the valve is sticking or not opening as it should. Processors 20 may thus implement artificial intelligence (AI) via models 60-2 to determine a difference from previous surge signatures and a current signature of a surge (e.g., after many cycles have occurred). As used herein, a cycle may be considered a system event, such as a surge.

In some embodiments, rate of rise component 32 may obtain high-resolution data from sensor 44 to monitor the rate of rise. In these or other embodiments, this component may detect and/or control a pressure rise that is leading to a surge via upstream piping system 40. Rate of rise component 32 may additionally or alternatively determine subsequent actions when a corresponding threshold is breached. This would typically happen using a local edge device so the decision to open a valve based on a rate of rise may occur locally.

In some embodiments, rate of rise component 32 may have a primary function of attempting to limit the rate of pressure rise in pipeline 40 from exceeding a preset limit. The rate of rise function may be operable over a normal operating pressure range. In these or other embodiments, this component may have a secondary function of attempting to limit the maximum operating pressure of the pipeline from exceeding a preset limit. This high-pressure limit function may be similar to that of a safety relief valve.

Figure 5:
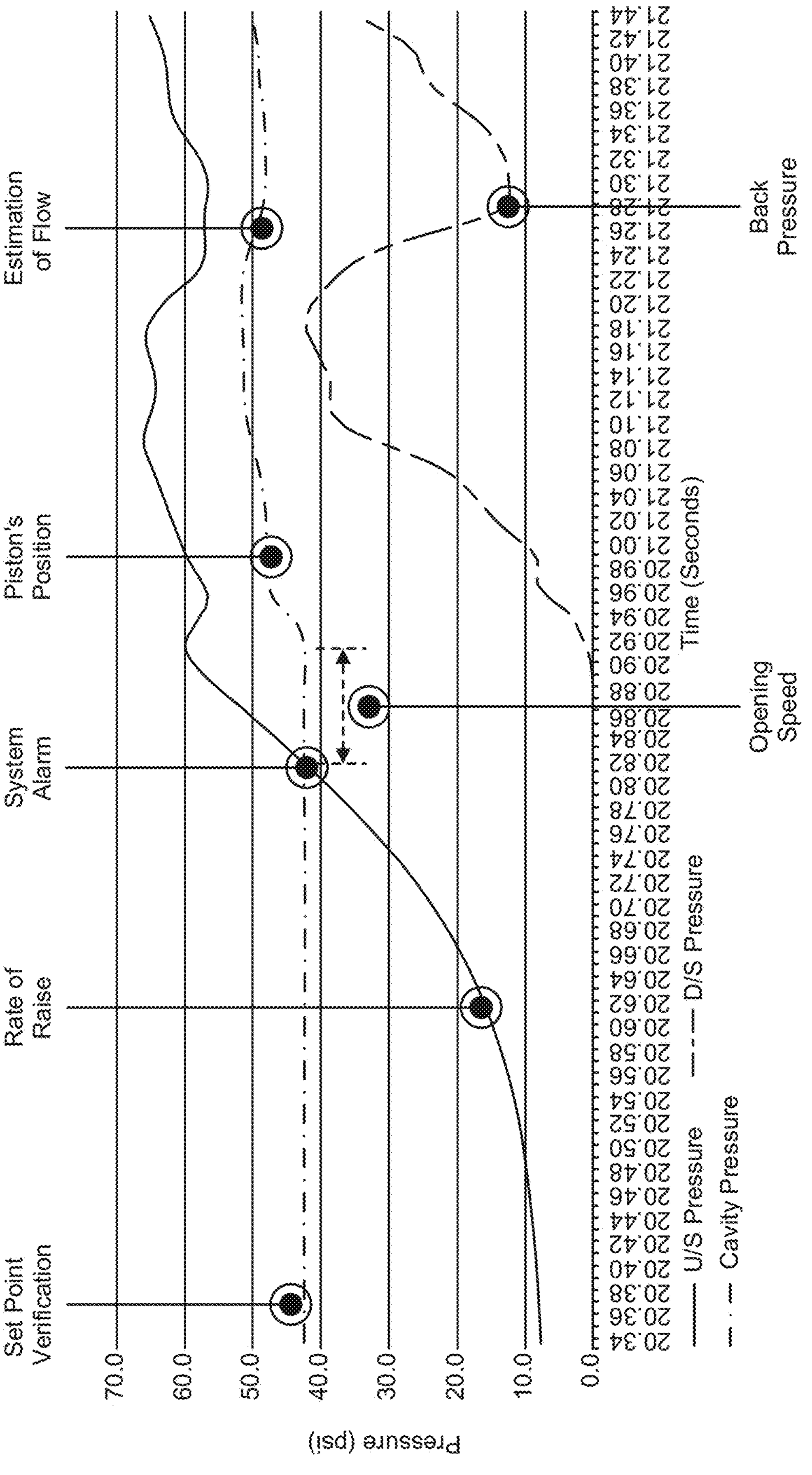
FIG. 5 illustrates example performance analysis of an initial portion of 1 event, in accordance with one or more embodiments.

The primary function may be achieved by a mechanical differential pilot (e.g., which may be hydraulic and remotely monitored) that may open the main valve or achieved by a digital pilot that may be activated due to the data analyzed by rate of rise component 32. A mechanical pilot may also be used in conjunction with component 32, as a redundant system to open the valve when a rate of rise velocity is exceeded. Rate of rise is measured in PSI per second, and it may indicate how fast the pressure is increasing per unit of time. The limit may be user-configurable. For example, a rate of rise of 10 PSI/second could indicate that a pump is slowing down and that a surge is about to occur. The surge is the effect. The rate of rise will happen before the actual surge. In this scenario, the rate of rise will tell the valve to open not letting the surge happen. Another benefit of an electronic rate of rise via component 32 is that it could detect much faster rate of rise events. In the example of FIG. 5, the rate of rise may be detected almost 200 milliseconds before the threshold is reached. Thus, if the valve opened at the 20.70 second mark, the threshold would not have reached, which is preferable. The main valve may be the plug that lets the fluid from the pipeline go through. The mechanical rate of rise system could have other plugs in the differential pilot or the pilot that are operating to let the main plug open. After the high-pressure rate of rise has subsided, the surge relief valve 42 may automatically close and normal pipeline operation may continue.

The foregoing approach may limit the effects of high pressure rise and prevent it from getting higher than the designed rate of pressure rise limit. In some embodiments, rate of rise component 32 may not only monitor and control the rate of pressure rise, but it may also monitor major surge events and cause implementation of system pressure relief at the set point.

In some embodiments, component 32 may digitally determine a rate of rise using sensor data. For example, this component or another component of processors 20 may cause an automatic opening of valve 42 (i.e., based on data) before the surge is even close to occurring or before the overpressure threshold is breached. The rate of rise may be determined by dividing an amount of pressure rise over two adjacent time intervals, or the rate of rise may be determined based on an increase over more than two adjacent time intervals. In some embodiments, rate of rise component 32 may determine abnormality when the rate of rise breaches a threshold. This rate of rise threshold (or another threshold discussed herein) may be user configurable, e.g., via UI devices 18. In an example, a problematic rate of rise may be low, e.g., when a pump slows down and pressure thereafter builds. That is, the problematic rate may be so low that system 10 may otherwise not be able to detect in time to react, but for the configuration of component 32 and its analysis of high-resolution data.

In some embodiments, system 10 may implement a distributive control function. For example, when communicating with relief valve 42 directly cellularly, intelligence may be put in the IoT or edge device mounted in relation to the valve, such as by pushing to it valve opening rules or rules about the rate of rise, e.g., from cloud computer 55. As such, one or more components of processors 20 may be on-site, e.g., such as in proximity to sensors 44. In this or another example, sensors 44 may have an optional communications link to processors 20.

In some embodiments, the signals outputted from sensors 44 may have a high-resolution and indicate information for overpressure component 34 to dynamically determine occurrence of an event. For example, this component and/or another component of processors 20 may obtain sensor data wirelessly. The sensors may be wired into the sensing location, and the IoT device may be what converts that signal from analog to digital and transmits it via a wired or wireless (e.g., cellular) network.

In some embodiments, flow state component 36 may obtain sensor data to provide an estimation of flow. For example, this component may estimate how much flow passed through valve 42 during a surge or overpressure event. In this example, reporting component 38 may output a report (e.g., to a government agency) indicating (i) that amount of fluid which passed through the valve during the event and/or (ii) a duration of the event.

In some embodiments, reconciling component 37 may make some diagnostic, e.g., if condition(s) and/or performance aspect(s) expected of valve 42 (e.g., based on a datasheet of the valve) differ from condition(s) and/or performance aspect(s) observed in deployment (e.g., based on the obtained high-resolution sensor data). In these or other embodiments, reconciling component 37 or flow state component 36 may condition the flow in some way after an event. For example, valve 42 may receive an adjustment affecting the flow conditions.

Upon an event occurring, surge relief valves are often closed too fast, which may create a secondary surge event by the operation of the equipment. For example, the valve closing speed may be too great (or too slow), which may create other issues; valve 42 may thus be closed at an ideal speed to avoid that. As such, flow state component 36 may implement flow conditioning after the event occurs.

In some embodiments, reconciling component 37 may cause performance of preventive maintenance. For example, the herein-discussed high-resolution data streams may be used as a basis for a more accurate estimation of cycles before failure and for a more optimal time to perform condition-based maintenance.

In some embodiments, reconciling component 37 may leverage herein-disclosed, high-resolution data for estimating a number of cycles before failure and/or predicting prognostic maintenance (e.g., which may be model-data based). For example, this component may assess a condition of valve 42, prior to and/or after an event. In another example, reconciling component 37 may determine a maintenance schedule based on valve 42's current and/or historical conditions. For example, this component may facilitate preventive and/or corrective maintenance based on a behavior of the valve.

In the example of FIG. 5 is depicted a plot of cavity pressure, including at 20.92 seconds, which shows an increase in the pressure; this indicates that the set point may change and indeed that it has increased as a result of a surge event. For example, the set point of valve 42 may be based on the cavity that is filled with nitrogen. In this or another example, leakage of nitrogen (or when running out of nitrogen due to bottles being empty) may cause the set point to start to decrease; as a result, set point verifying component 31 may provide an indication that the valve may open at an inlet pressure that is significantly lower than what would otherwise be expected.

FIG. 6 demonstrates a decreasing of the set point, after about 450 cycles. Before 450 cycles, the set point has a few upward steps, since the valve is opening (e.g., it is compressing the cavity). But at about 450 cycles in this example, a leak of nitrogen occurs, causing a downward shift of the set point. In this example, instead of valve 42 opening at an inlet pressure set point of 45 PSI, the valve may open at 30 PSI and then open even as low as 20 PSI. This is significant, as users of system 10 may want instead for valve 42 to operate closer to an original set point. Such problematic shifts of the set point may interrupt normal operations and cause down time. Accordingly, set point verifying component 31 may be configured to send a signal that the set point is correct or that the set point has shifted too much, causing need for action to be performed by the users.

In some embodiments, a component of processors 20 may obtain models 60-2 to predict, via machine learning, a number of cycles before failure, a number of cycles before condition-based maintenance is warranted, a time to open valve 42 based on a too-high rate of rise, and/or a time to notify a user of system 10 based on another underperforming characteristic disclosed herein.

In some embodiments, one or more components of processors 20 may be configured to obtain training data from electronic storage 22, from external resources 24, via UI device(s) 18, and/or from network 70. The connection to network 70 may be wireless or wired.

In some embodiments, system 10 may incorporate a complete monitoring system (e.g., including pressure, vibration, temperature, or another parameter) and/or allocate the data in a web portal. In these other embodiments, system 10 may include electrical devices that may be monitored and actuated remotely (e.g., from the cloud and/or from the edge or IoT device). For example, rules for how valve 42 is to react may be distributed to the edge or IoT device.

In some embodiments, processors 20 may implement autonomous control to provide satisfactory performance with significant uncertainties in the environment. These processors of system 10 may additionally or alternatively implement ability to compensate for system failures with external intervention, with the use of prognostic maintenance (e.g., model-data driven), a digital replica of the piping system, and/or IoT sensors and actuators. For example, system 10 may autonomously monitor performance and/or indicate need for preventive action, e.g., to avoid catastrophic failure. The herein disclosed transient monitoring may be performed wirelessly and include long term performance analysis.

In some embodiments, system 10 may also implement product upgrades. When it is determined that the valve is not opening fast enough or when it is determined that there is not enough flow going through the valve, it might require to redesign the system to a bigger valve, for example. In these or other embodiments, system 10 may support on events reporting (e.g., if there is an event and if there is a need to report the same to the government or internally, some embodiments may have the data to support that), leverage data for future developments, and/or cause prevention or control of damage.

Figure 7:
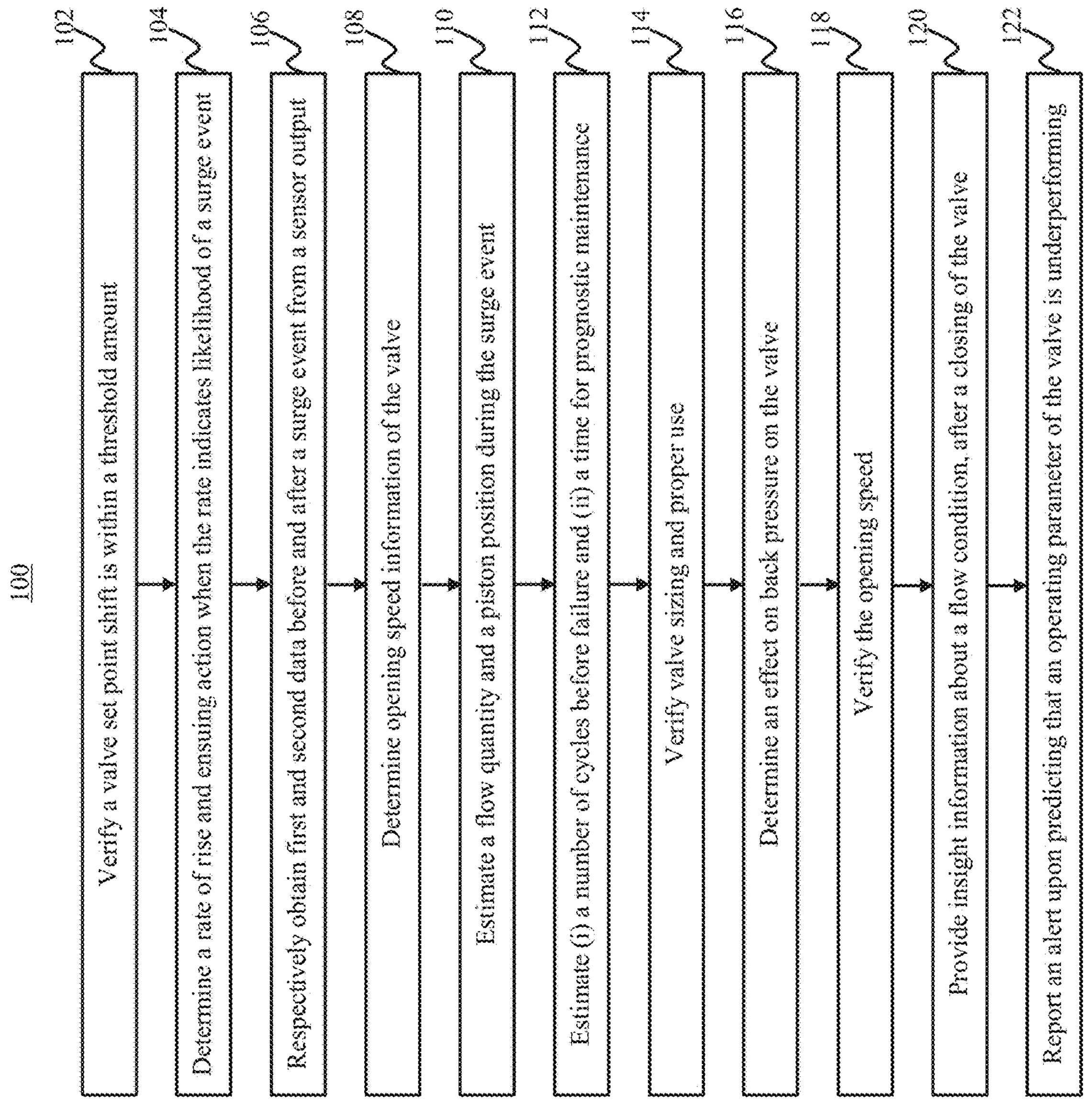
FIG. 7 illustrates a process for monitoring a valve, in accordance with one or more embodiments.

FIG. 7 illustrates method 100 for better understanding of relief events, enabling more efficient operations and improved safety and/or reliability, in accordance with one or more embodiments. Method 100 may be performed with a computer system comprising one or more computer processors and/or other components. The processors are configured by machine readable instructions to execute computer program components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 7 and described below is not intended to be limiting. In some embodiments, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

At operation 102 of method 100, a valve set point shift may be verified to be within a threshold amount. In some embodiments, operation 102 is performed by a processor component the same as or similar to set point verifying component 31 (shown in FIG. 1 and described herein).

At operation 104 of method 100, a rate of rise and ensuing action may be determined, when the rate indicates likelihood of a surge event. In some embodiments, upon rate of rise component 32 determining that upstream (U/S) pressure (i.e., at the inlet) is too steep, indicating a high or very fast rate of rise, this component may cause reconciling component 37 to send a signal to open valve 42. This scenario is shown in the example of FIG. 5. In some embodiments, operation 104 is performed by a processor component the same as or similar to rate of rise component 32 (shown in FIG. 1 and described herein).

Figure 4:
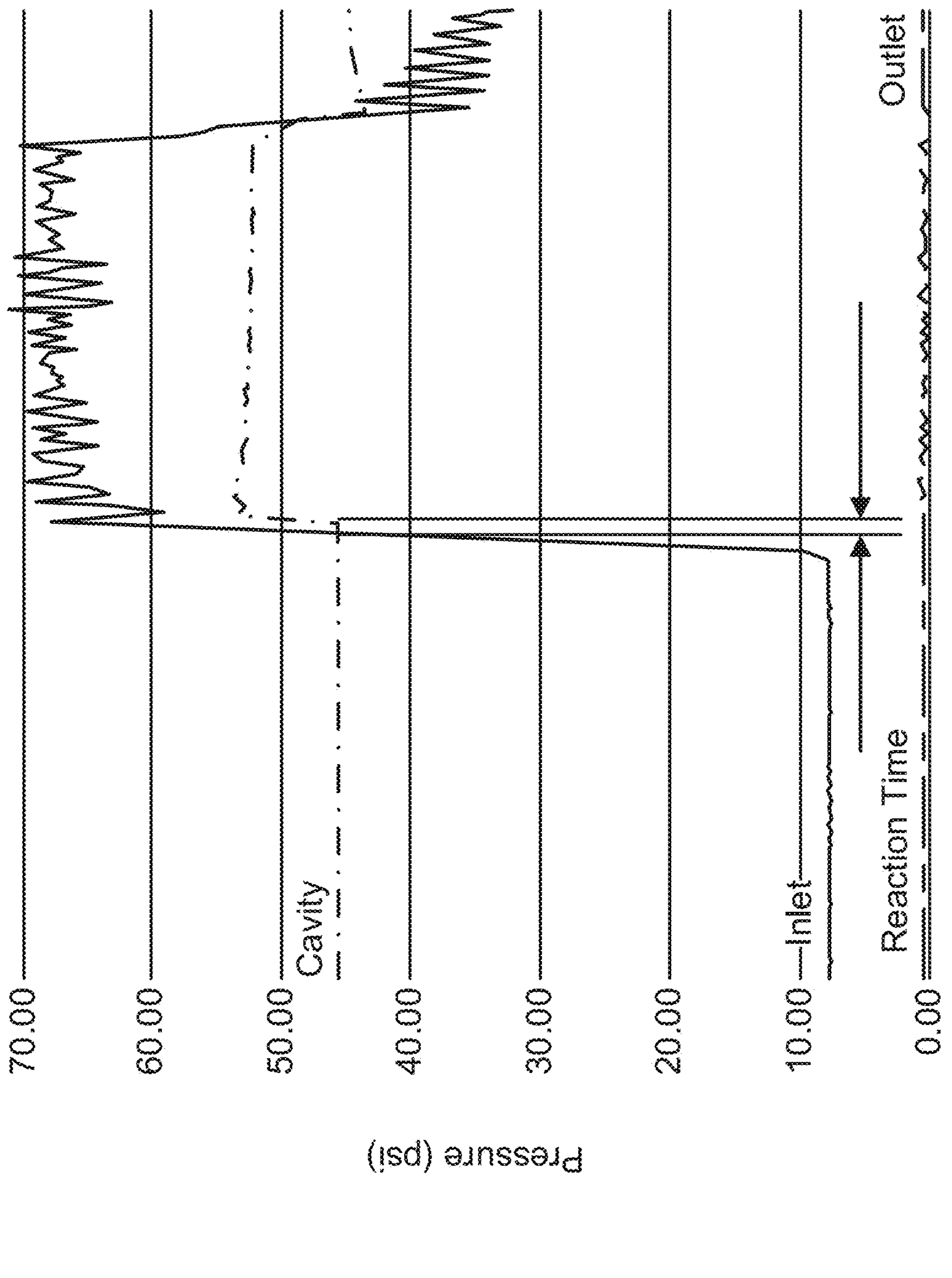
FIG. 4 illustrates example performance analysis of 1 event, in accordance with one or more embodiments.

At operation 106 of method 100, first and second data may be obtained before and after a surge event, respectively, from a sensor's output. An example of a surge event is depicted in FIGS. 4-5. In some embodiments, upon overpressure component 34 determining that the upstream pressure is greater than the cavity pressure, indicating an overpressure event, this component may cause reporting component 38 to set an alarm and send the alarm to a set of users. For example, this component may determine that the inlet pressure, at an event, exceeds the cavity pressure, to then open valve 42. This is shown in the example of FIG. 5. In some embodiments, operation 106 is performed by a processor component the same as or similar to overpressure component 34 (shown in FIG. 1 and described herein).

At operation 108 of method 100, opening speed information of the valve may be determined. For example, opening speed component 33 may estimate an opening speed of valve 42. This is shown in the example of FIG. 4. In some embodiments, operation 108 is performed by a processor component the same as or similar to opening speed component 33 (shown in FIG. 1 and described herein).

At operation 110 of method 100, a flow quantity and a piston position during the surge event may be estimated. In some embodiments, flow state component 36 may determine (i) where a piston or plug is in valve 42 and (ii) how much the valve opens, when an event occurs, to estimate parameter(s) of the flow. For example, this component may obtain information as to how much gallons per minute goes through the valve at certain positions of the piston/plug, to then estimate how much the flow was through the valve in the event. This is shown in the example of FIG. 5. And in FIG. 5 is depicted a plot of the downstream (D/S) pressure, which may indicate that the plug of valve 42 is opening. In some embodiments, operation 110 is performed by a processor component the same as or similar to flow state component 36 (shown in FIG. 1 and described herein).

At operation 112 of method 100, a number of cycles before failure and a time for prognostic maintenance may be estimated. In some embodiments, operation 112 is performed by a processor component the same as or similar to reconciling component 37 (shown in FIG. 1 and described herein).

At operation 114 of method 100, valve sizing and proper use may be verified. In some embodiments, operation 114 is performed by a processor component the same as or similar to reconciling component 37.

At operation 116 of method 100, an effect on back pressure on the valve may be determined. For example, back pressure component 35 may obtain high-resolution sensor data to determine an effect of back pressure on valve 42. That is, the back pressure may create a different behavior on the valve than what would otherwise be expected. This is shown in the example of FIG. 5. In some embodiments, operation 116 is performed by a processor component the same as or similar to back pressure component 35 (shown in FIG. 1 and described herein).

At operation 118 of method 100, the opening speed may be verified. In some embodiments, operation 118 is performed by a processor component the same as or similar to opening speed component 33 (shown in FIG. 1 and described herein).

At operation 120 of method 100, insight information about a flow condition may be provided, after a closing of the valve. In some embodiments, operation 120 is performed by a processor component the same as or similar to flow state component 36.

At operation 122 of method 100, an alert may be reported, upon predicting that one or more of the aforementioned operating parameters of the valve is underperforming. In some embodiments, operation 122 is performed by a processor component the same as or similar to reporting component 38 (shown in FIG. 1 and described herein).

Techniques described herein may be implemented in digital electronic circuitry, or in computer hardware, firmware, software, or in combinations of them. The techniques may be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps of the techniques may be performed by one or more programmable processors executing a computer program to perform functions of the techniques by operating on input data and generating output. Method steps may also be performed by, and apparatus of the techniques may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor may receive instructions and data from a read-only memory or a random access memory or both. The essential elements of a computer are a processor for executing instructions and one or more memory devices for storing instructions and data. Generally, a computer may also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory may be supplemented by, or incorporated in special purpose logic circuitry.

Several embodiments of the disclosure are specifically illustrated and/or described herein. However, it may be appreciated that modifications and variations are contemplated and within the purview of the appended claims.

What is claimed is:

1. A system, comprising:
- a surge relief valve;
- a set of instruments (i) coupled to the surge relief valve and (ii) configured to output first and second data based on a prediction, each of the first and second data having a quality level satisfying a first criterion;
- a computer; and
- a non-transitory medium comprising instructions executable by the computer to perform a method, comprising:
  - reporting first information based on the prediction that an operating characteristic of the surge relief valve satisfies a second criterion, wherein the second criterion relates to a reduction of a pressure set point in a cavity of the surge relief valve.

2. The system of claim 1, wherein the method further comprises displaying, via a user interface, a current set point of a pressure of nitrogen in the cavity of the surge relief valve.

3. The system of claim 1, wherein the computer is implemented in at least one of an online device and a cloud platform, and wherein the prediction (i) indicates that the surge relief valve is underperforming and (ii) is performed at the online device, the online device being at an edge of a network.

4. The system of claim 3, wherein the computer is further implemented at a control-room computer.

5. The system of claim 1, wherein the method further comprises estimating a flow quantity and a position of a piston of the valve during a surge event, the estimations being based on a reaction time, the position of the piston, and an actual time of the event.

6. The system of claim 1, wherein the method further comprises providing second information about a flow condition after a closing of the valve.

7. The system of claim 1, wherein the first and second data are used to estimate a number of cycles before failure that satisfies an accuracy criterion.

8. The system of claim 1, wherein the first and second data are used to estimate a number of cycles before preventive maintenance is to be performed, the estimation satisfying an accuracy criterion.

9. The system of claim 1, wherein the method further comprises determining, based on the first and second data, a verification of a valve sizing and proper use.

10. The system of claim 1, wherein the method further comprises determining, based on the first and second data, a verification of a valve opening speed.

11. A system, comprising:

a surge relief valve;

a set of instruments (i) coupled to the surge relief valve and (ii) configured to output first and second data based on a prediction, each of the first and second data having a quality level satisfying a first criterion;

a computer; and a non-transitory medium comprising instructions executable by the computer to perform a method, comprising:

reporting first information based on the prediction that an operating characteristic of the surge relief valve satisfies a second criterion, wherein the second criterion relates to a rate of rise between at least two consecutives pressure readings of a pipeline upstream of the surge relief valve.

12. The system of claim 11, wherein the computer is implemented in at least one of an online device and a cloud platform, and wherein the prediction (i) indicates that the surge relief valve is underperforming and (ii) is performed at the online device, the online device being at an edge of a network.

13. The system of claim 11, wherein the method further comprises estimating a flow quantity and a position of a piston of the valve during a surge event, the estimations being based on a reaction time, the position of the piston, and an actual time of the event.

14. The system of claim 11, wherein the method further comprises providing second information about a flow condition after a closing of the valve.

15. The system of claim 11, wherein the first and second data are used to estimate a number of cycles before failure that satisfies an accuracy criterion.

16. The system of claim 11, wherein the first and second data are used to estimate a number of cycles before preventive maintenance is to be performed, the estimation satisfying an accuracy criterion.

17. The system of claim 11, wherein the method further comprises displaying, via a user interface, a current set point of a pressure of nitrogen in the cavity of the surge relief valve.

18. The system of claim 12, wherein the computer is further implemented at a control-room computer.

* * * * *